United States Patent [19]

Kanbara et al.

[11] 4,084,463
[45] Apr. 18, 1978

[54] APPARATUS FOR CUTTING AND CHAMFERING IRREGULAR SHAPED PIPES

[75] Inventors: Takahiro Kanbara, Kusatsu; Toshihiko Mituhara, Moriyama, both of Japan

[73] Assignee: Sekisui Kagaku Kogyo Kabushiki Kaisha, Osaka, Japan

[21] Appl. No.: 759,523

[22] Filed: Jan. 14, 1977

[51] Int. Cl.² .................. B23B 37/00; B23B 3/28
[52] U.S. Cl. .......................... 82/53.1; 82/19
[58] Field of Search ............... 82/53.1, 60, 70.2, 71, 82/19; 29/27 R

[56] References Cited

U.S. PATENT DOCUMENTS

| 2,312,573 | 3/1943 | Motch, Jr. et al. ............ 82/71 X |
| 3,756,128 | 9/1973 | Armstrong et al. ............ 82/53.1 |
| 3,771,393 | 11/1973 | Gatto et al. ............ 82/53.1 |

FOREIGN PATENT DOCUMENTS

| 970,752 | 9/1964 | United Kingdom ............ 82/53.1 |
| 1,116,961 | 6/1968 | United Kingdom ............ 82/60 |
| 1,392,637 | 4/1975 | United Kingdom ............ 82/70.2 |

Primary Examiner—Harrison L. Hinson
Attorney, Agent, or Firm—Sughrue, Rothwell, Mion, Zinn and Macpeak

[57] ABSTRACT

A rotatable drum 4 is supported by rollers 5 on a travelling frame member 1, and surrounds a pipe 3 gripped by the frame member. Swing levers 6, 6' coupled at their one ends to and driven by fluid pressure cylinders 10, 10' are pivotally mounted on the drum at journals 7, 7', and guide rollers 11, 11' and associated cutting and chamfering members 9, 9' rotatably driven by motors 8, 8' are mounted on the swing levers and extend inwardly towards the pipe. Pressure fluctuations in the cylinders are absorbed by accumulators 13, 13', whereby the chamfering and cutting members are sequentially driven into engagement with and smoothly follow the uneven contours of the pipe surface.

7 Claims, 3 Drawing Figures

4,084,463

APPARATUS FOR CUTTING AND CHAMFERING IRREGULAR SHAPED PIPES

BACKGROUND OF THE INVENTION

This invention relates to an apparatus for cutting and chamfering synthetic resin pipes having irregular or non-circular cross sections.

In the prior art pipe cutting apparatus, cutting and chamfering members are mounted on a rotating drum which surrounds the pipe and rotates around the periphery thereof. The cutting members are brought into contact with the peripheral surface of the pipe, and such members are rotated in order to cut the pipe and chamfer the end face thereof. Such apparatus are designed to accomodate normal or circular pipes, and are thus ineffective for pipes having irregular shaped cross sections, such as an ellipse or an egg-shape. Because the rotating cutting members in such conventional apparatus orbit around the center axis of the pipe, the cutting edges cannot follow along the surface of a pipe having an elliptical and egg-shaped cross section.

SUMMARY OF THE INVENTION

An object of the present invention is thus to provide a pipe cutting and chamfering apparatus whose cutting edges are capable of smoothly following the peripheral surface of a pipe having an irregular shaped cross section, such as an ellipse or an egg-shape.

According to the invention, a pair of swing levers and fluid pressure drive cylinders therefor are pivotally mounted on a travelling drum which surrounds the pipe, and rotates around the periphery thereof. Each swing lever is connected to a piston rod of one of the fluid pressure cylinders, and mounts a pipe contacting guide roller and a rotatably driven cutting member. Pressure variations in the cylinders are absorbed by accumulators, whereby the cutting members are driven into contact with and smoothly follow the uneven contours of the pipe surfaces.

DETAILED DESCRIPTION OF THE PREFERRED EMBODIMENTS

Figure 1:
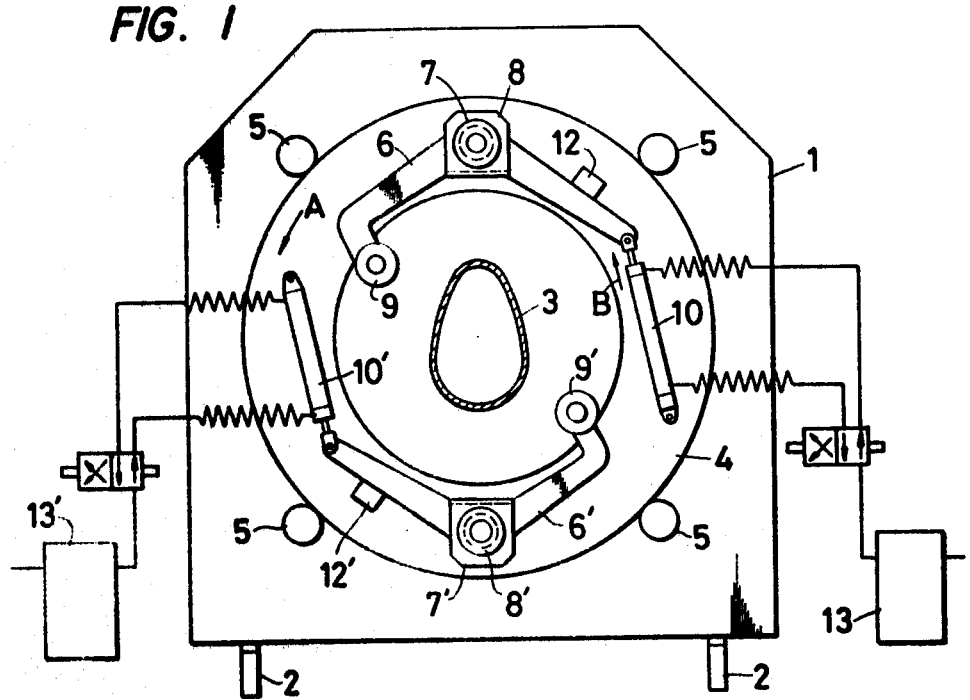
FIG. 1 shows a front view, partly in schematic form, of an apparatus for cutting pipes according to a first embodiment of the present invention.
Figure 2:
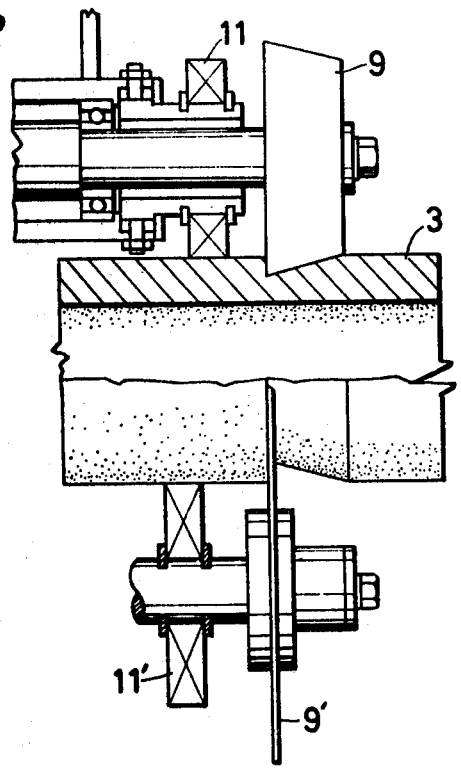
FIG. 2 shows a partial sectional side view of the cutting apparatus shown in FIG. 1 during a cutting operation.
Figure 3:
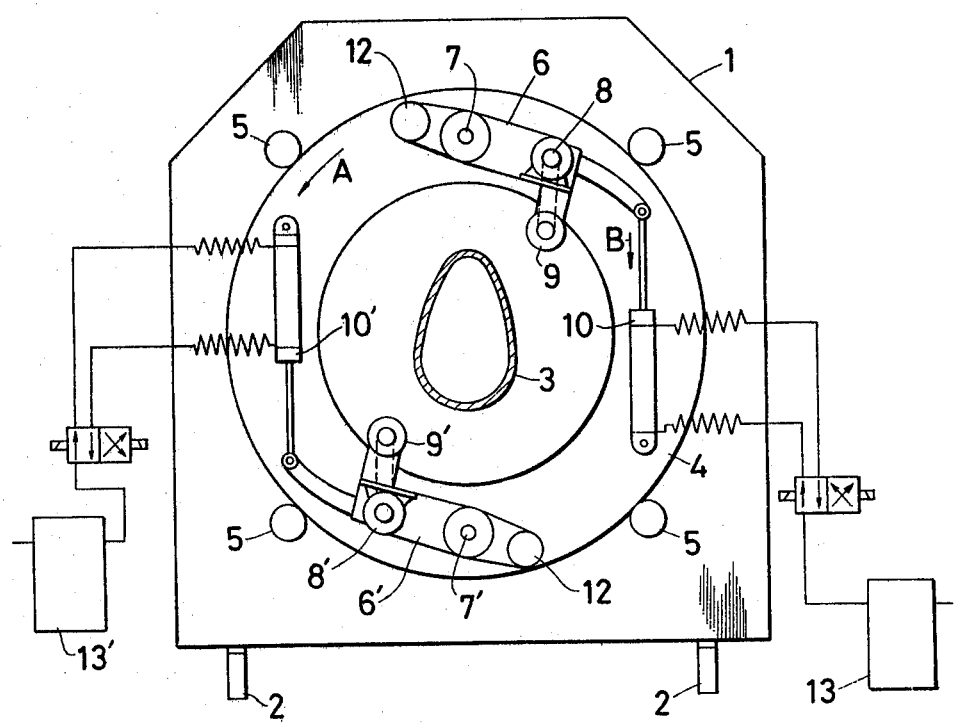
FIG. 3 shows a front view of a pipe cutting apparatus according to a second embodiment of the present invention.

As shown in FIGS. 1 and 3, a frame member 1 surrounds a synthetic resin pipe 3 having an oval or egg-shaped cross section continuously delivered by an extruder (not shown). The frame member is movable along the exttusion axis on tracks or rollers 2, in accordance with the extrusion speed of the pipe 3. A drum 4 is rotatably supported by rollers 5 on the frame member 1, and can be rotated around the periphery of the pipe 3 by a drive apparatus (not shown). Swing levers 6 and 6' are pivotally supported by journals 7 and 7' mounted on the rotating drum 4. One end of each swing lever is pivotally connected to a piston rod of a fluid pressure cylinder 10 or 10'. Motors 8 and 8' for rotating cutting members 9 and 9' through belt or chain drives are mounted at the journals 7 and 7' (FIG. 1) of the swing levers 6 and 6'. The cutting members 9 and 9' are attached to the other ends of the swing levers on the same axles as guide rollers 11 and 11', such axles being parallel to the center axis of the rotating drum 4. The guide rollers serve as followers, and engage the sides of the pipe 3 during a cutting operation (See FIG. 2). The cutting member 9 is used for chamfering, and the cutting member or disc 9' is used for severing.

Counterweights 12 and 12' balance the swing levers 6 and 6' with respect to their pivotal fulcrums at journals 7 and 7', but such counterweights may be omitted depending on the apparatus design. The fluid pressure cylinders 10 and 10' are pivotally mounted at their one ends on the drum 4. The levers 6 and 6' are thus driven about their journals 7 and 7' in accordance with the reciprocation of the piston rods, whereby the cutting members 9 and 9' may be made to continuously follow the irregular surface of the pipe 3.

Accumulators 13 and 13' lessen the fluid pressure variations in the cylinders 10 and 10', and keep the pressing force of the cutting members 9 and 9' and guide rollers 11 and 11' at a constant level during a cutting operation. The accumulators 13 and 13' are coupled to the fluid extension or expansion lines of the cylinders 10 and 10' through respective spool control valves.

In operation, a continuously extruded synthetic resin pipe 3 having an oval or egg-shaped cross section is engaged by a gripping mechanism (not shown) provided on the frame member, at a desired position, whereby the frame member advances or travels with the movement of the pipe 3 on the tracks or rollers 2. At the same time, the drum 4 is rotated in the direction of arrow A, and the fluid pressure cylinder 10 is operated to extend its piston rod in the direction of arrow B, whereby the cutting member 9 contacts the surface of the pipe 3. The member 9 is rotated by the motor 8, and guided on the peripheral surface of the pipe 3 by its associated guide roller 11, whereby the member 9 travels smoothly over the outer peripheral surface of the pipe 3 and makes a chamfered cut therein. Since the lever 6 is well-balanced with respect to its supporting journal 7 and since the accumulator 13 absorbs fluid pressure fluctuations in the cylinder 10, the pressure exerted by the guide roller and cutting member against the outer peripheral surface of the pipe 3 is substantially constant. Thus, even though the pipe has an irregular rather than a normal circular cross section, the chamfering edge of the cutting member 9 moves smoothly over the outer peripheral surface of the pipe.

After the chamfering cut has been made in the pipe to the depth shown in FIG. 2, which requires just a single complete rotation of the drum 4, the fluid pressure cylinder 10 is operated in reverse so that its piston rod retracts and the cutting end of the lever 6 swings away from the pipe 3. The drum 4 is then rotated in the reverse direction, and the fluid pressure cylinder 10' is operated to extend its piston rod and thereby swing the cutting member 9' and guide roller 11' into contact with the surface of the pipe.

As shown in FIG. 2, the cutting disc enters the pipe along the straight or perpendicular edge of the chamfered cut, and severs the pipe by closely following the outer peripheral surface thereof.

In the same manner as described above with respect to the cutting member 9, since the swing lever 6' is well-balanced and the accumulator 13' absorbs pressure variations in the cylinder 10', the force exerted against the pipe by the cutting member 9' is substantially constant, and it travels smoothly over the outer peripheral surface of the pipe. After the drum 4 has completed a rotation and the pipe has been severed, the cylinder 10' is operated in reverse to retract its piston rod and swing the cutting member 9' and guide roller 11' away from the pipe 3. The gripping mechanism is then opened to release the pipe, and the frame member 1 is returned to its original position. The series of operations involving the movement of the frame member, the actuation of the fluid pressure cylinders 10 and 10', and the rotation of the drum 4 and the cutting members 9 and 9', are automatically controlled by a conventional, programmable mechanism (not shown).

Although separate chamfering and cutting members have been disclosed, it will be apparent that a single member can be used for both chamfering and cutting. In such a case, only one swing lever and fluid pressure cylinder is needed. Furthermore, the drum has been disclosed as rotating in opposite directions for chamfering and cutting, but this is not necessary and is primarily a function of the design of the accumulators 13 and 13'.

In the manner described above, the end face of the pipe 3 is completely cut and chamfered. If such process is performed repeatedly, the extruded synthetic resin pipe 3 can be effectively and automatically cut into predetermined lengths with chamfered end faces.

The embodiment of the invention shown in FIG. 3 is different from that of FIG. 1 in that the motors 8, 8', the cutting members 9, 9', and the guide rollers 11, 11' are positioned between the journals 7, 7' and the fluid pressure cylinders 10, 10', and the counter weights 12, 12' are mounted on the far ends of the levers 6, 6'.

It will be appreciated, of course, that while the invention has been disclosed as being particularly adapted for the cutting of pipes having irregular shaped cross-sections, normal or round pipes can be cut and chamfered with equal facility.

What is claimed is:

1. An apparatus for cutting circular and non-circular pipes, comprising:
   a. a rotatable drum through which the pipe to be cut extends,
   b. a first lever pivotally mounted on an end face of said drum,
   c. a first fluid pressure cylinder pivotally mounted on said end face,
   d. a first piston rod extending out of said cylinder and connected to one end of said lever,
   e. a first cutting member rotatably mounted on said lever and extending toward the pipe,
   f. first dirve means for rotating said cutting member
   g. a first guide roller rotatably mounted on said lever adjacent said cutting member and axially aligned therewith, whereby said lever, cutting member, and guide roller may be pivoted toward the pipe by the actuation of said fluid pressure cylinder, whereby said cutting member cuts into the pipe to a depth determined by the guide roller, the latter engaging and following the surface of the pipe as the drum rotates thereabout, and
   h. a first accumulator means coupled to said cylinder for maintaining the pressing force of said guide roller against the periphery of said pipe as said guide roller follows the periphery of said pipe.

2. An apparatus as defined in claim 1, further comprising a second lever, fluid pressure cylinder, piston rod, cutting member, drive means, and guide roller, all arranged as recited in claim 1 and positioned diametrically opposite their like counterparts on said end face of the drum, and a second accumulator coupled to said second cylinder for maintaining the pressing force of said second guide roller against the periphery of said pipe, said first cutting member comprising a cutting disc and said second cutting member comprising a chamfering wheel.

3. An apparatus as defined in claim 2, wherein each lever is pivotally mounted proximate its midpoint, and each cutting member and guide roller is mounted on the other end of its respective lever.

4. An apparatus as defined in claim 2, wherein each lever is pivotally mounted proximate the other end thereof, and each cutting member and guide roller is mounted on its respective lever between said pivotal mounting and said one end thereof.

5. An apparatus as defined in claim 3, further comprising a counterweight mounted on each lever at a position to balance the lever about its pivotal mounting.

6. An apparatus as defined in claim 4, further comprising a counterweight mounted on each lever at a position to balance the lever about its pivotal mounting.

7. An apparatus as defined in claim 2, wherein each fluid pressure cylinder is double-acting whereby it can extend or retract its associated piston rod, and further comprising a travelling carriage, and roller means rotatably mounting said drum on said carriage.

* * * * *

UNITED STATES PATENT OFFICE
CERTIFICATE OF CORRECTION

Patent No. 4,084,463            Dated April 18, 1978

Inventor(s) Tadahiro KANBARA et al

It is certified that error appears in the above-identified patent and that said Letters Patent are hereby corrected as shown below:

IN THE HEADING:

Inventors: Delete Takahiro Kanbara, insert -- Tadahiro Kanbara --

Signed and Sealed this

Twelfth Day of September 1978

[SEAL]

Attest:

RUTH C. MASON
*Attesting Officer*

DONALD W. BANNER
*Commissioner of Patents and Trademarks*